United States Patent
Leuthold et al.

(10) Patent No.: US 9,200,671 B2
(45) Date of Patent: Dec. 1, 2015

(54) FLUID DYNAMIC BEARING RESERVOIR

(71) Applicant: Seagate Technology LLC, Cupertino, CA (US)

(72) Inventors: Hans Leuthold, Santa Cruz, CA (US); Troy M. Herndon, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 142 days.

(21) Appl. No.: 13/919,508

(22) Filed: Jun. 17, 2013

(65) Prior Publication Data

US 2014/0369630 A1 Dec. 18, 2014

(51) Int. Cl.
*F16C 32/06* (2006.01)
*F16C 33/10* (2006.01)
*F16C 17/10* (2006.01)

(52) U.S. Cl.
CPC ............. *F16C 33/103* (2013.01); *F16C 17/107* (2013.01); *F16C 2370/12* (2013.01); *F16C 2380/26* (2013.01)

(58) Field of Classification Search
CPC ............. F16C 2380/26; F16C 32/0607; F16C 32/0633; F16C 32/0659; F16C 33/103; F16C 33/1085; F16C 33/1055
USPC .......... 384/100, 107, 113–115, 120, 123, 134
See application file for complete search history.

(56) References Cited

U.S. PATENT DOCUMENTS

| | | | |
|---|---|---|---|
| 2,877,066 A * | 3/1959 | Baumeister | 384/107 |
| 3,049,383 A * | 8/1962 | Loch | 384/100 |
| 3,661,432 A * | 5/1972 | Aihara | 384/104 |
| 4,496,194 A * | 1/1985 | Phillips | 384/12 |
| 4,887,914 A * | 12/1989 | Lin et al. | 384/12 |
| 5,246,294 A * | 9/1993 | Pan | 384/119 |
| 5,516,212 A * | 5/1996 | Titcomb | 384/107 |
| 5,558,443 A | 9/1996 | Zang | |
| 5,980,113 A | 11/1999 | Grantz | |
| 6,296,391 B1 * | 10/2001 | Hayakawa et al. | 384/119 |
| 6,669,369 B1 * | 12/2003 | Nottingham et al. | 384/110 |
| 6,702,408 B1 * | 3/2004 | Nagarathnam et al. | 384/112 |
| 6,749,340 B1 * | 6/2004 | Rudd et al. | 384/110 |
| 6,854,889 B2 * | 2/2005 | Nishimura et al. | 384/119 |
| 6,933,643 B1 * | 8/2005 | Heine et al. | 310/90.5 |
| 7,073,945 B2 * | 7/2006 | Aiello et al. | 384/107 |
| 7,133,250 B2 | 11/2006 | Herndon et al. | |
| 7,234,868 B2 | 6/2007 | Tiller et al. | |
| 7,262,935 B2 * | 8/2007 | LeBlanc | 360/99.08 |
| 7,362,022 B2 | 4/2008 | Flores et al. | |
| 7,407,327 B2 | 8/2008 | Le et al. | |
| 7,416,341 B2 | 8/2008 | Flores et al. | |
| 7,726,882 B2 * | 6/2010 | Parsoneault et al. | 384/132 |
| 7,758,246 B2 * | 7/2010 | Aiello et al. | 384/107 |
| 7,866,890 B2 | 1/2011 | Drautz | |

(Continued)

OTHER PUBLICATIONS

International Search Report and Written Opinion, PCT Application No. PCT/US2014/042704, mailed Oct. 7, 2014.

*Primary Examiner* — Marcus Charles

(57) ABSTRACT

Disclosed herein is an apparatus that includes a fluid dynamic bearing defined in a gap between an inner component and an outer component. In some instances, the inner component and the outer component are configured for relative rotation. In some instances, the apparatus further includes a fluid reservoir configured to supply a fluid to the fluid dynamic bearing and the fluid reservoir is defined by shearless surfaces.

20 Claims, 5 Drawing Sheets

(56) References Cited

U.S. PATENT DOCUMENTS

| | | |
|---|---|---|
| 2003/0190100 A1 | 10/2003 | Grantz et al. |
| 2004/0091188 A1 | 5/2004 | Aiello et al. |
| 2005/0100256 A1* | 5/2005 | Nagarathnam et al. ....... 384/107 |
| 2006/0051003 A1* | 3/2006 | Nii et al. ...................... 384/114 |
| 2006/0255672 A1 | 11/2006 | Flores et al. |
| 2009/0033164 A1* | 2/2009 | Khan ............................. 310/90 |
| 2009/0079283 A1 | 3/2009 | LeBlanc et al. |
| 2010/0303393 A1* | 12/2010 | Hipwell et al. ............... 384/108 |
| 2011/0285232 A1 | 11/2011 | Le et al. |
| 2013/0119801 A1 | 5/2013 | Smirnov et al. |

* cited by examiner

FLUID DYNAMIC BEARING RESERVOIR

BACKGROUND

Fluid dynamic bearing (FDB) motors include fluid dynamic bearings between components of the motor. The fluid dynamic bearings include a fluid, such as lubricating oil. To maintain a long lifespan and reliable operation of the motor and of the fluid dynamic bearings, fluid is maintained within the motor. In some instances, capillary seals are used to retain fluid in the fluid dynamic bearings. However, the number of capillary seals and the volume of fluid retained by the capillary seals may be dependent on the size and design specification of the FDB motor.

SUMMARY

In some embodiments described herein is an apparatus that includes a fluid dynamic bearing defined in a gap between an inner component and an outer component. In some instances, the inner component and the outer component are configured for relative rotation. In some instances, the apparatus further includes a fluid reservoir configured to supply a fluid to the fluid dynamic bearing and the fluid reservoir is defined by shearless surfaces.

These and other features, aspects, and embodiments may be better understood with reference to the following drawings, description, and appended claims.

DRAWINGS

Various embodiments are illustrated by way of example, and not by way of limitation, in the figures of the accompanying drawings and in which like reference numerals refer to similar elements.

DESCRIPTION

Figure 1:
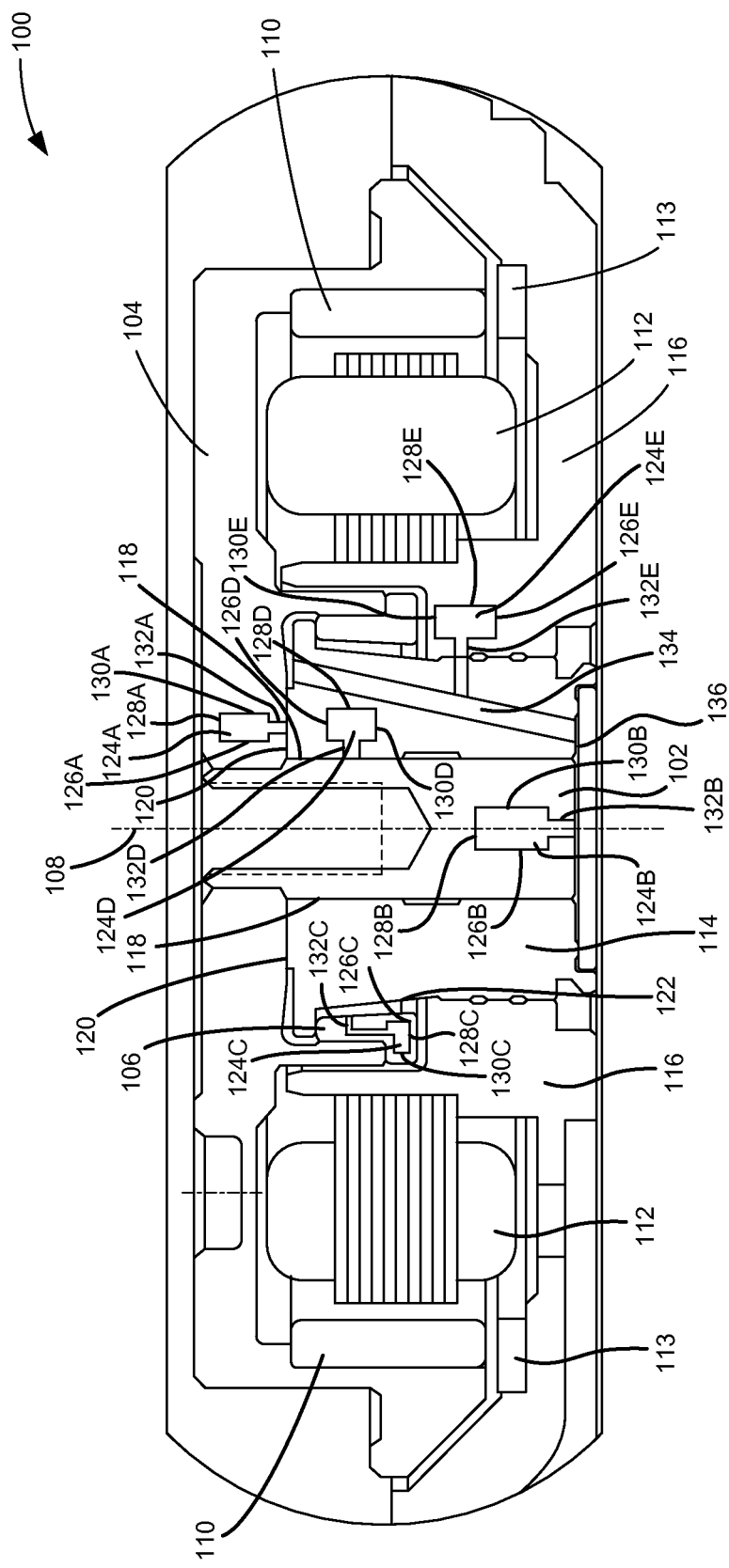
FIG. 1 illustrates a sectional side view of a FDB motor incorporating a fluid reservoir according to one aspect of the present embodiments.

Before various embodiments are described in greater detail, it should be understood by persons having ordinary skill in the art that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

An apparatus described herein is configured to efficiently utilize internal volumes to store and to supply fluid, such as lubricating oil, to fluid dynamic bearings in hard disk storage devices. However, embodiments described herein can be applied to any device utilizing fluid dynamic bearings. By storing fluid in underutilized volumes of a motor, a greater volume of fluid may be stored and supplied to the fluid dynamic bearings. Further, by storing greater volumes of fluid, the lifespan of the motor may be extended. Additionally, fluid reservoirs described herein may utilize internal volumes of a motor with minimal to no impact on the performance of the motor.

In some embodiments, a fluid reservoir may be formed within a rotatable component and/or a stationary component of a motor that are configured for relative rotation. For example, fluid reservoirs may be formed within a shaft and/or a sleeve of a motor. In another example, fluid reservoirs may be formed within a hub, a base plate, and/or a base cup of a motor.

In some embodiments, fluid reservoirs are formed in components that include shearless surfaces. Shearless surfaces are surfaces that have approximately equal rotational speeds with respect to each other. For example, shearless surfaces may be surfaces of a component that are stationary as a motor operates. In this example, these surfaces are considered shearless because they rotate at an equal speed of zero. In another example, shearless surfaces may be surfaces of a component that rotate at approximately equal speeds as a motor operates. In this example, a motor may operate at 5400 rotations per minute (RPM), and the shearless surfaces may be surfaces within a hub of the motor. Here, as the hub rotates at 5400 RPM, the shearless surfaces also rotate at approximately 5400 RPM and, as such, appear to be stationary with respect to one another. Because these surfaces are stationary with respect to each other, they are conducive to use and form a fluid reservoir within a component.

In some embodiments, fluid reservoirs are positioned within a motor to interface with a fluid dynamic bearing to supply fluid to the bearing. In some embodiments, fluid reservoirs are configured to interface with a gaseous environment, such as air, to allow fluid to deplete from the fluid reservoirs.

FIG. 1 illustrates a sectional side view of a FDB motor incorporating a fluid reservoir according to one aspect of the present embodiments. In some embodiments, the FDB motor 100 may be used in a disk drive data storage device, such as the disc drive 500 described in FIG. 5. This FDB motor 100 includes a rotatable component, a stationary component, a fluid dynamic bearing and fluid reservoirs.

In FIG. 1, the FDB motor 100 includes a rotatable component and a stationary component that are relatively rotatable with respect to each other. The rotatable components include a shaft 102, a hub 104 and a limiter bushing 106. The hub 104 includes a disk flange, which supports a disk pack for rotation about an axis 108 of shaft 102. Magnets 110 interact with a stator 112 to cause the hub 104 to rotate. The limiter bushing 106 is a sleeve used in between the hub 104 and a sleeve 114 to maintain motor retention, for example during shock events. The stationary components include sleeve 114 and stator 112, which are affixed to a base plate 116.

A fluid dynamic bearing is defined in a gap between the stationary component and the rotatable component. For instance, in FIG. 1, a journal bearing 118 is established between the sleeve 114 and the rotating shaft 102. A thrust bearing 120 is established between the sleeve 114 and the hub 104. The thrust bearing 120 provides an upward force on hub 104 to counterbalance downward forces including the weight of hub 104, axial forces between the hub 104 and biasing magnet 113, and axial forces between stator 112 and magnet 110. The fluid dynamic bearing includes a fluid that fills the gap between the stationary component and the rotatable component. In some embodiments, the fluid may be a lubricating oil, a liquid, a gas, or a combination thereof.

In some embodiments, a fluid reservoir is defined in a gap between diverging surfaces of the stationary component and the rotatable component. For instance, a capillary seal 122 is defined in a gap between the sleeve 114 and the limiter bushing 106 whose diverging surfaces retain fluid by means of meniscus surface tension, which serves as a fluid reservoir for the bearings 118 and 120.

Additionally or alternatively, in some embodiments, fluid reservoirs may be defined within components of the FDB motor 100 to efficiently use underutilized internal volumes as a fluid reserve. These additional fluid reserves are available to the motor 100 as fluid is lost from the bearings (e.g. evaporation), which helps to extend the lifespan of FDB motor 100. For instance, fluid reservoirs may be defined within the rotatable and/or the stationary components of the FDB motor 100. For example, in FIG. 1, fluid reservoirs 124A and 124B are formed within the hub 104 and the shaft 102, respectively. In another example, fluid reservoirs 124C, 124D and 124E are formed within the limiter bushing 106, the sleeve 114 and the base plate 116, respectively.

In some embodiments, a fluid reservoir is bounded by shearless surfaces that rotate at approximately equal speeds with respect to one another. For example, fluid reservoir 124A includes surfaces 126A, 128A and 130A within hub 104 and a channel 132A that supplies fluid to the fluid dynamic bearing 120. Surfaces 126A, 128A and 130A form a cavity to store a volume of fluid. Here, surfaces 126A, 128A and 130A are considered shearless because each of these surfaces has approximately the same rotational speed while FDB motor 100 operates. In an illustrative example, motor 100 may operate at 5400 RPM, and cause the hub 104 and surfaces 126A, 128A and 130A to rotate at about 5400 RPM. Because surfaces 126A, 128A, 130A rotate at approximately equal speeds, the surfaces produce nearly equal internal forces against each other such that the surfaces 126A, 128A and 130A are stationary with respect to each other. In this way, the shearless surfaces 126A, 128A and 130A allow fluid to be stored and contained within fluid reservoir 124A.

Shearless surfaces of fluid reservoir 124A may be further understood in comparison to surfaces of capillary seal 122. In contrast to fluid reservoir 124A, capillary seal 122 is formed between surfaces of sleeve 114 and of limiter bushing 106 that rotate at differing speeds while motor 100 operates. For example, limiter bushing 106 may rotate with the hub 104 at 5400 RPM, while the sleeve 114 rotates at 0 RPM. As the example illustrates, the surfaces that surround the capillary seal 120 differ from shearless surfaces in that the surfaces of the capillary seal 122 rotate at unequal speeds, instead of substantially equal speeds.

In some instances, surfaces 126A, 128A and 130A of fluid reservoir 124A have approximately the same rotational speed with respect with each other while FDB motor 100 is not operational. For example, when motor 100 is powered off, the hub 104 and surfaces 126A, 128A and 130A are stationary. In this example, surfaces 126A, 128A and 130A are also considered shearless because the surfaces have an equal rotational speed of zero.

The examples discussed above describe motor 100 with an operational speed of 5400 RPM for illustration purposes and is not intended to limit the scope of the embodiments. In other embodiments, motor 100 may operate at different rotational speeds of at least 5800 RPM, 5900 RPM, 7200 RPM, 10,000 RPM, or other rotational speeds based on the speed design of a disc drive device.

Similar to fluid reservoir 124A, fluid reservoirs 124B and 124C are formed in rotatable components, the shaft 102 and the limiter bushing 106 respectively. Additionally, similar to fluid reservoir 124A, fluid reservoirs 124B and 124C are formed using surfaces 126B-C, 128B-C and 130B-C, respectively. As noted above, in some embodiments, surfaces 126B-C, 128B-C and 130B-C are considered shearless because these surfaces have approximately the same rotational speeds with respect to one another. Further, fluid reservoirs 124B and 124C include channels 132B and 132C, respectively, that supply fluid to the fluid dynamic bearings.

In some embodiments, fluid reservoirs may be defined within stationary components of motor 100. For example in FIG. 1, fluid reservoirs 124D and 124E are formed within the sleeve 114 and the base plate 116, respectively. Fluid reservoirs 124D and 124E are formed using surfaces 126D-E, 128D-E and 130D-E, respectively. In some embodiments, surfaces 126D-E, 128D-E and 130D-E are considered shearless because these surfaces have approximately the same rotational speeds. For example, while FDB motor 100 operates, the sleeve 114 is stationary and does not rotate. Consequently, surfaces 126D, 128D and 130D are stationary and have equal rotational speeds of zero. Similar to surfaces 126D, 128D and 130D, surfaces 126E, 128E and 130E of fluid reservoir 124D are also shearless because surfaces 126E, 128E and 130E have approximately the same rotational speed by being stationary, regardless of whether motor 100 is operational.

Fluid reservoirs 124D and 124E include channels 132D and 132E, respectively that supply fluid to the fluid dynamic bearings. In some embodiments, fluid reservoirs may indirectly supply fluid to the fluid dynamic bearings. For example, channel 132E supplies fluid to a recirculation path 134. The recirculation path 134 connects fluid bearings 120 and 136 and further supplies fluid to these bearings.

In some embodiments, fluid reservoirs 124A-E may include additional channels (not shown) that are different from channels 132A-132E. These additional channels may be formed at one of the surfaces of fluid reservoirs 124A-E. In some embodiments, the additional channels may be configured to allow fluid within the fluid reservoirs 124A-E to deplete by allowing gases, such as air, to enter and replace the fluid within the fluid reservoirs. Further embodiments of these additional channels are described below with respect to FIGS. 3A-3C and FIGS. 4A-4C.

As fluid reservoirs 124A-E illustrate, untapped or underutilized volumes of a motor may be used to store a reserve of fluid and provide fluid to the fluid dynamic bearings. By including a greater reserve of fluid within a motor, the performance reliability and the life of the motor is extended.

Figure 2:
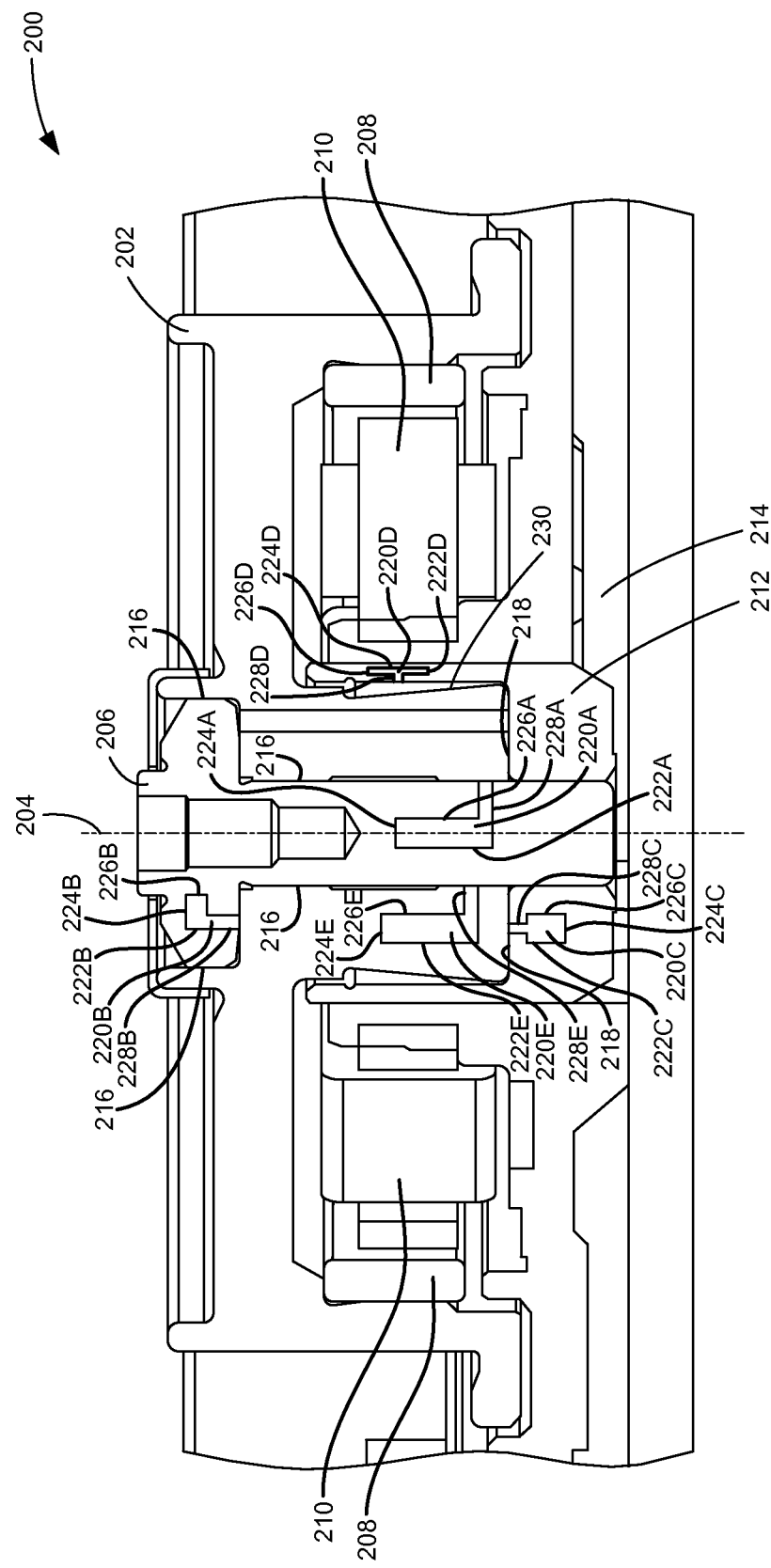
FIG. 2 illustrates a sectional side view of a FDB motor incorporating a fluid reservoir according to one aspect of the present embodiments.

FIG. 2 illustrates a sectional side view of a FDB motor incorporating a fluid reservoir according to one aspect of the present embodiments. In some embodiments, FDB motor 200 may be used in a disk drive data storage device, such as the disc drive 500 described in FIG. 5. Similar to FDB motor 100 of FIG. 1, FDB motor 200 includes a rotatable component, a stationary component, a fluid dynamic bearing and fluid reservoirs.

Similar to FDB 100 of FIG. 1, the rotatable component and stationary component of FDB motor 200 are configured for relative rotation. Rotatable components may include a combined hub and sleeve 202, hereinafter referred to as hub/sleeve 202. The hub/sleeve 202 is a unitary piece that rotates about axis 204 of shaft 206. As described in FIG. 1, magnets 208 interact with stators 210 to cause the hub/sleeve 202 to rotate. The stationary components may include the shaft 206, a base cup 212, and a base plate 214. In some embodiments, the shaft 206 is secured to the base cup 212, and the base cup 212 is further secured to the base plate 214. In other embodiments, the base cup 212 and the base plate 214 may be an integral component that is fixed to shaft 206.

In some embodiments, as discussed in FIG. 1, fluid dynamic bearings may be defined in between interfaces of the rotatable and stationary components of motor 200. For example, in FIG. 2, a fluid dynamic bearing 216 is defined between the interfaces of shaft 206 and hub/sleeve 202. Another fluid dynamic bearing 218 is defined between the interfaces of the base cup 212 and the hub/sleeve 202. As noted in FIG. 1, the fluid dynamic bearings 216 and 218 include a fluid, such as lubricating oil, which fills the interface between the stationary and rotatable components.

Similar to FIG. 1, fluid reservoirs may be formed within the rotatable components, the stationary components, or a combination thereof. In FIG. 2, two fluid reservoirs 220A and 220B are formed within shaft 206. Fluid reservoirs 220A and 220B are encapsulated by surfaces 222A-B, 224A-B and 226A-B, respectively, within shaft 206. As discussed in FIG. 1, surfaces 222A-B, 224A-B and 226A-B are shearless surfaces because these surfaces have approximately the same rotational speed. Fluid reservoirs 220A and 220B further include channels 228A and 228B, respectively, that supply fluid to fluid dynamic bearing 216.

Similar to the fluid reservoirs described herein, the base cup 212 includes fluid reservoirs 220C and 220D. Fluid reservoir 220C is defined by shearless surfaces 222C, 224C and 226C that are relatively stationary with respect to one another, and the reservoir 220C further includes a channel 228C that supplies fluid to the fluid dynamic bearing 218. Similar to fluid reservoir 220C, fluid reservoir 220D is also formed by shearless surfaces 222D, 224D and 226D that are relatively stationary with respect to each other. Further, fluid reservoir 220D includes a channel 228D that supplies fluid to a capillary seal 230. Here, fluid reservoir 220D serves as a supplementary reserve of fluid to capillary seal 230. As fluid depletes from the capillary seal 230, it is replenished by fluid reservoir 220D.

As described in FIG. 1, in some embodiments, a fluid reservoir may be formed within the rotatable components. In FIG. 2, a fluid reservoir 220E is formed within the hub/sleeve 202. Similar to the other fluid reservoirs described herein, fluid reservoir 220E includes shearless surfaces 222E, 224E and 226E that have approximately the same rotational speeds. Further, fluid reservoir 220E includes a channel 228E that supplies fluid to the fluid dynamic bearing 216.

As described in FIG. 1, in some embodiments, fluid reservoirs 220A-E may include additional channels (not shown) that are different from channels 228A-E. These additional channels may be formed at one of the surfaces of fluid reservoirs 220A-E. In some embodiments, the additional channels may be configured to allow fluid within the fluid reservoirs 220A-E to deplete by allowing gases to enter and replace the fluid within the fluid reservoirs. Further embodiments of these additional channels are described below with respect to FIGS. 3A-3C and FIGS. 4A-4C.

As FIG. 1 and FIG. 2 illustrate, fluid reservoirs described herein provide a mechanism to efficiently utilize internal volumes to store greater amounts of fluid within a motor. As the various embodiments described herein further illustrate, fluid reservoirs are formed within a component that include shearless surfaces.

FIG. 1 and FIG. 2 also illustrate a motor with multiple fluid reservoirs. In other embodiments, more or fewer fluid reservoirs may be included in a motor. Further, different combination of fluid reservoirs may be used in a motor. For example, a motor may be configured to include a fluid reservoir within a rotatable component and not within a stationary component of a motor, or vice versa. In another example, as depicted in FIG. 1 and FIG. 2, a motor may be configured to include fluid reservoirs in the rotatable and the stationary components of a motor.

Figure 3A:
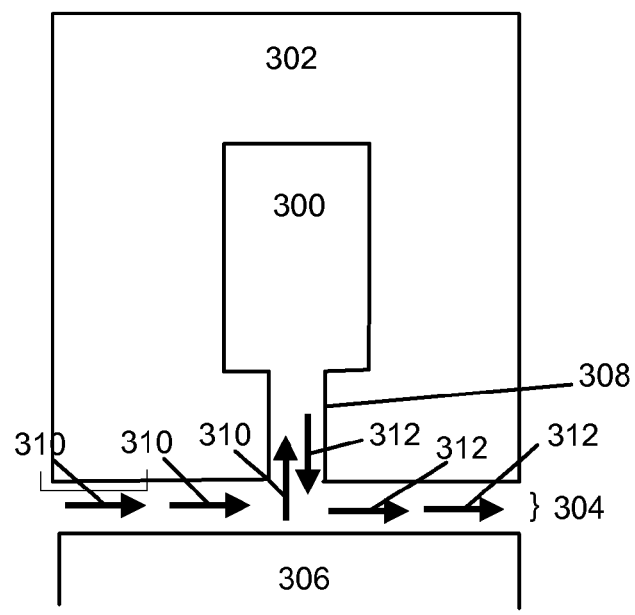
FIGS. 3A, 3B and 3C illustrate fluid reservoirs according to some aspects of the present embodiments.
Figures 3B, 3C:
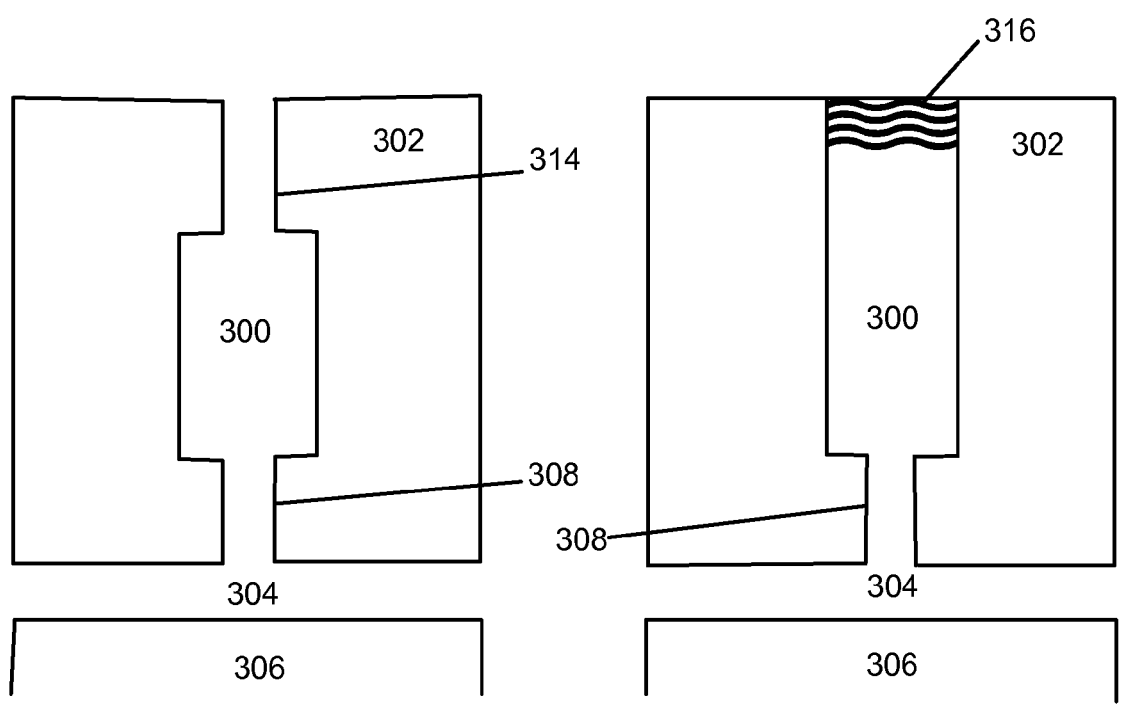

FIGS. 3A, 3B and 3C illustrate fluid reservoirs according to some aspects of the present embodiments. In some embodiments, the fluid reservoirs illustrated in FIGS. 3A, 3B and 3C may be used in an FDB motor, such as FDB motor 100 of FIG. 1 and FDB motor 200 of FIG. 2. In some embodiments, the fluid reservoirs discussed in FIG. 1 and FIG. 2 may incorporate one or more features of fluid reservoirs of FIGS. 3A, 3B and 3C, which are further described below.

FIG. 3A illustrates a fluid reservoir 300 formed within a component 302 that is in fluidic communication with a fluid dynamic bearing 304 in between components 302 and 306. In some embodiments, the components 302 and 306 may be rotatable components or stationary components of a FDB motor, as described in FIG. 1 and FIG. 2. Further, in some embodiments, the fluid dynamic bearing 304 may be similar to the fluid dynamic bearings described in FIG. 1 and FIG. 2.

In some embodiments, fluid reservoir 300 may be configured to allow fluid to deplete from the reservoir. For example, in FIG. 3A, fluid reservoir 300 includes a channel 308 that assists in depleting fluid from the reservoir. In this example, channel 308 allows gas or gasses 310 (depicted as arrows), such as air that circulates through the fluid dynamic bearings of a device, to enter fluid reservoir 300. As gas 310 enters through channel 308, fluid 312 (depicted as arrows) exits the channel 308 into the fluid dynamic bearing 304. In this way, channel 308 facilitates the depletion of fluid stored in fluid reservoir 300, as well as helps remove gas 310 from circulation.

In some embodiments, fluid reservoir 300 may interface with a gaseous environment to allow fluid to deplete. For example, in FIG. 3B, fluid reservoir 300 includes an additional channel 314 that helps vent the fluid reservoir 300 to a gaseous environment. In another example, in FIG. 3C, fluid reservoir 300 includes a vent 316 (e.g. a one way valve) that assists in ventilating the fluid reservoir 300.

Figure 4A:
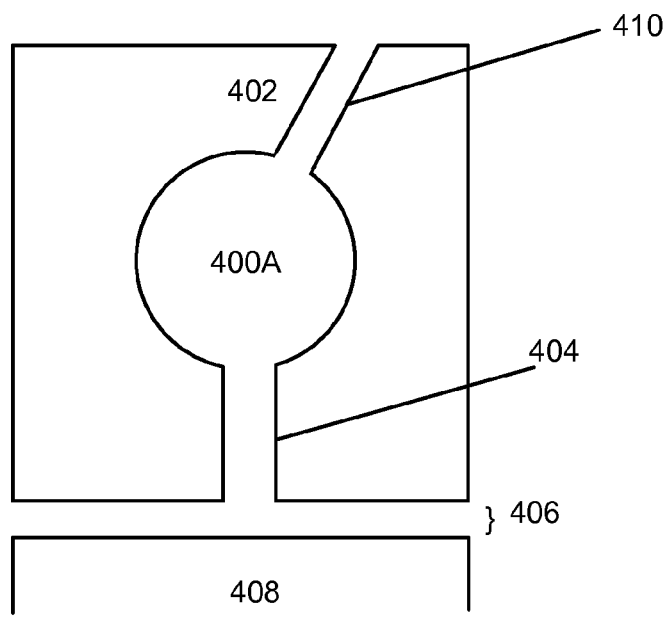
FIGS. 4A, 4B and 4C illustrate fluid reservoirs according to some aspects of the present embodiments.
Figure 4B:
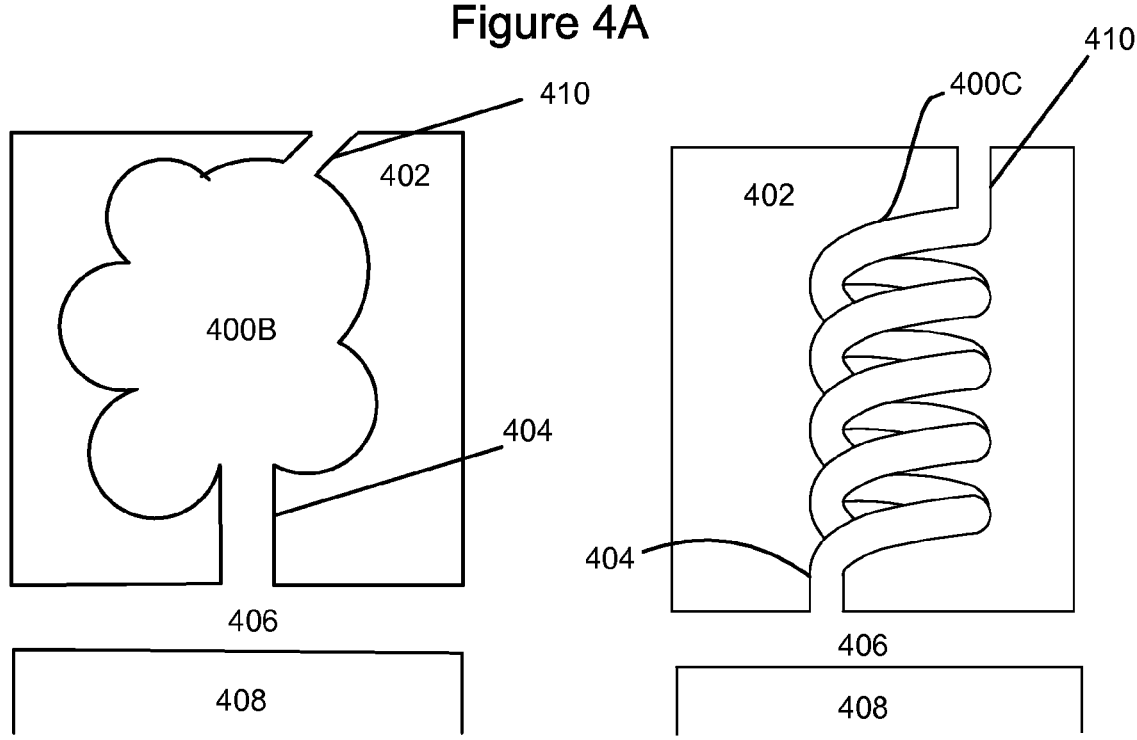
Figure 4C:
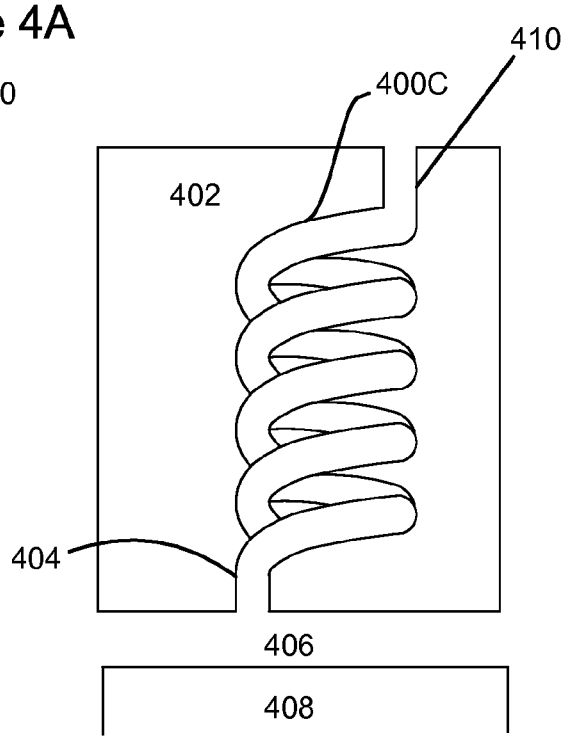

FIGS. 4A, 4B and 4C illustrate fluid reservoirs according to some aspects of the present embodiments. In some embodiments, the fluid reservoirs illustrated in FIGS. 4A, 4B and 4C may be used in an FDB motor, such as FDB motor 100 of FIG.

1 and FDB motor 200 of FIG. 2. In some embodiments, the fluid reservoirs discussed in FIG. 1 and FIG. 2 may incorporate one or more features of the fluid reservoirs of FIGS. 4A, 4B and 4C, which are further described below.

FIG. 4A illustrates a fluid reservoir 400A formed in a component 402 and includes a channel 404 that allows the fluid reservoir 400A to be in fluidic communication with a fluid dynamic bearing 406 in between components 402 and 408. In some embodiments, components 402 and 408 may be rotatable components and/or stationary components of an FDB motor as described in FIG. 1 and FIG. 2. In some embodiments, fluid reservoir 400A may comprise an additional channel 410. Channel 410 may facilitate the depletion of fluid within the fluid reservoir 400A by allowing gases, such as air, to enter the fluid reservoir 400A. In some embodiments, channel 410 may function in a substantially similar manner as channel 314 and vent 316 of FIG. 3.

In some embodiments, fluid reservoirs described herein may be of a symmetrical shape. For example in FIG. 4A, fluid reservoir 400A is in a symmetrical circular shape. In another example, the fluid reservoir may be in the shape of a square or a rectangle similar to fluid reservoirs 124A, 124B, 124D and 124E of FIG. 1 and fluid reservoir 220C of FIG. 2.

In some embodiments, fluid reservoirs described herein may be of an asymmetrical shape. For example, in FIG. 4B, fluid reservoir 400B is in an uneven cloud like shape. In another example, a fluid reservoir may be of an asymmetrical square and/or rectangle shape, such as a parallelogram or a rhombus shape. In yet another example, the fluid reservoir may be shaped similar to fluid reservoirs 220A, 220B and 220E of FIG. 2.

In some embodiments, fluid reservoirs described herein may be of a spiral shape, such as fluid reservoir 400C of FIG. 4C.

Figure 5:
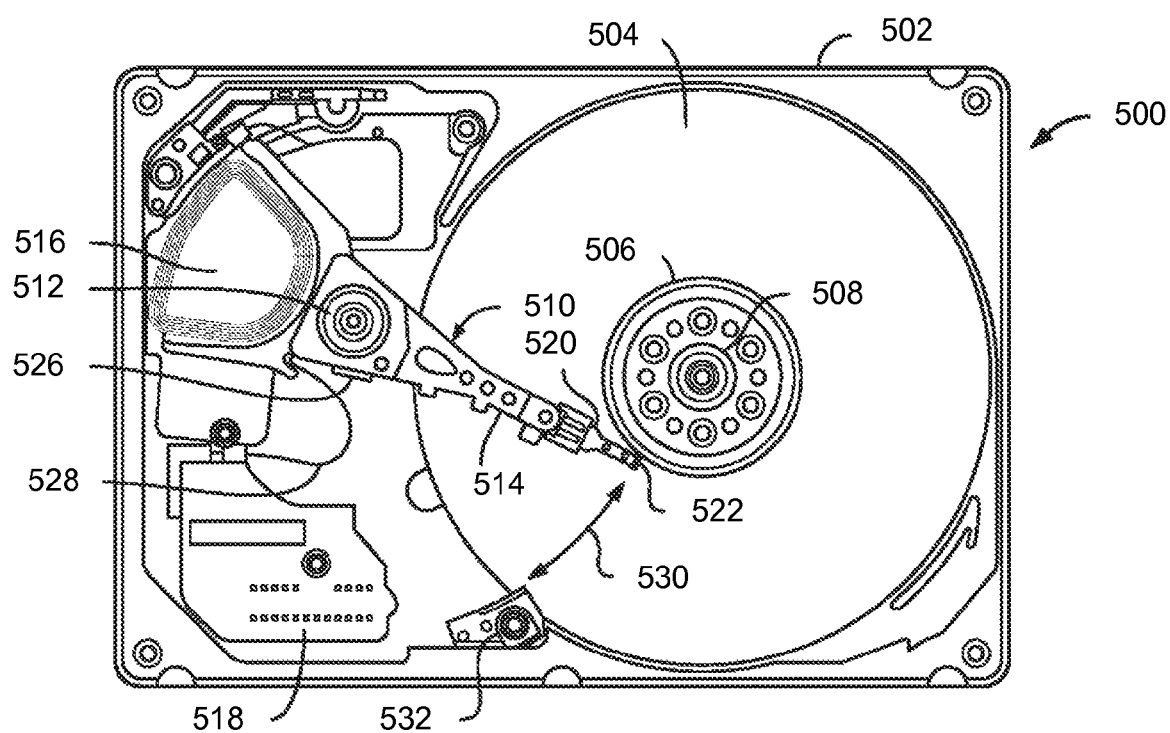
FIG. 5 is a plan view of a data storage device according to one aspect of the present embodiments.

FIG. 5 is a plan view of a data storage device in which fluid reservoirs described herein may be used. A disk drive 500 generally includes a base plate 502 and a cover (not shown) that may be disposed on the base plate 502 to define an enclosed housing for various disk drive components. The disk drive 500 includes one or more data storage disks 504 of computer-readable data storage media. Typically, both of the major surfaces of each data storage disk 504 include a plurality of concentrically disposed tracks for data storage purposes. Each data storage disk 504 is mounted on a hub or spindle 506, which in turn is rotatably interconnected with the base plate 502 and/or cover. Multiple data storage disks 504 are typically mounted in vertically spaced and parallel relation on the spindle 506. A spindle motor 508 rotates the data storage disks 504.

The disk drive 500 also includes an actuator arm assembly 510 that pivots about a pivot bearing 512, which in turn is rotatably supported by the base plate 502 and/or cover. The actuator arm assembly 510 includes one or more individual rigid actuator arms 514 that extend out from near the pivot bearing 512. Multiple actuator arms 514 are typically disposed in vertically spaced relation, with one actuator arm 514 being provided for each major data storage surface of each data storage disk 504 of the disk drive 500. Other types of actuator arm assembly configurations could be utilized as well, e.g. an "E" block having one or more rigid actuator arm tips or the like that cantilever from a common structure. Movement of the actuator arm assembly 510 is provided by an actuator arm drive assembly, such as a voice coil motor 516 or the like. The voice coil motor 516 is a magnetic assembly that controls the operation of the actuator arm assembly 510 under the direction of control electronics 518.

A load beam or suspension 520 is attached to the free end of each actuator arm 514 and cantilevers therefrom. Typically, the suspension 520 is biased generally toward its corresponding data storage disk 504 by a spring-like force. A slider 522 is disposed at or near the free end of each suspension 520. What is commonly referred to as the read/write head (e.g., transducer) is appropriately mounted as a head unit (not shown) under the slider 522 and is used in disk drive read/write operations. The head unit under the slider 522 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 522 is connected to a preamplifier 526, which is interconnected with the control electronics 518 of the disk drive 500 by a flex cable 528 that is typically mounted on the actuator arm assembly 510. Signals are exchanged between the head unit and its corresponding data storage disk 504 for disk drive read/write operations. In this regard, the voice coil motor 516 is utilized to pivot the actuator arm assembly 510 to simultaneously move the slider 522 along a path 530 and across the corresponding data storage disk 504 to position the head unit at the appropriate position on the data storage disk 504 for disk drive read/write operations.

When the disk drive 500 is not in operation, the actuator arm assembly 510 is pivoted to a "parked position" to dispose each slider 522 generally at or beyond a perimeter of its corresponding data storage disk 504, but in any case in vertically spaced relation to its corresponding data storage disk 504. In this regard, the disk drive 500 includes a ramp assembly 532 that is disposed beyond a perimeter of the data storage disk 504 to both move the corresponding slider 522 vertically away from its corresponding data storage disk 504 and to also exert somewhat of a retaining force on the actuator arm assembly 510.

As provided herein is an apparatus comprising a stationary component, a rotatable component, a fluid dynamic bearing defined in a gap between the stationary component and the rotatable component, wherein the stationary component and the rotatable component are configured for relative rotation, and a fluid reservoir in at least one of the stationary component or the rotatable component, wherein the fluid reservoir is bounded by surfaces that are stationary with respect to one another. In some embodiments, the fluid reservoir is configured to hold a volume of fluid and is configured to allow the volume of fluid to deplete. In some embodiments, a portion of the fluid reservoir interfaces with a gaseous environment to allow a volume of fluid to deplete. In yet some further embodiments, the fluid reservoir is configured to supply fluid to the fluid dynamic bearing. In some embodiments, the fluid reservoir is a symmetrical shape, an asymmetrical shape, or a spiral shape. In some embodiments, the apparatus further comprises a channel, wherein the channel connects the fluid reservoir to the fluid dynamic bearing. In some embodiments, the apparatus further comprises a fluid reservoir defined in a gap between diverging surfaces of the stationary component and the rotatable component.

Also provided herein is an apparatus, comprising a fluid dynamic bearing defined in a gap between an inner component and an outer component, wherein the inner component and the outer component are configured for relative rotation, and a fluid reservoir configured to supply a fluid to the fluid dynamic bearing, wherein shearless surfaces define the fluid reservoir. In some embodiments, the shearless surfaces are located within the inner component or the outer component. In yet some further embodiments, the shearless surfaces are surfaces that are configured to be stationary. In some embodiments, the shearless surfaces are surfaces that are configured to rotate at equal speeds. In some embodiments, the fluid reservoir is configured to hold a volume of the fluid and is configured to allow the volume of the fluid to deplete. In some embodiments, the fluid reservoir supplies fluid to the fluid dynamic bearing through at least a channel.

Also provided herein is an apparatus, comprising a first surface, a second surface, wherein the first surface and second surface have approximately same rotational speed relative to each other, and a fluid reservoir bounded by the first surface and the second surface, wherein the fluid reservoir is configured to supply a fluid to a fluid dynamic bearing. In some embodiments, the apparatus further comprises of a stationary component, and a rotatable component, wherein the stationary component or the rotatable component include the fluid reservoir, and the stationary component and the rotatable component are configured for relative rotation. In some embodiments, the apparatus further comprises a channel, wherein the channel allows gas to enter the fluid reservoir, thereby allowing fluid to leave the fluid reservoir. In some embodiments, the apparatus further comprises a fluid recirculation system connected to the fluid dynamic bearing, and at least a channel connecting the fluid reservoir to the fluid recirculation system. In some embodiments, the first surface and the second surface are configured to rotate with respect to a stationary component of the fluid dynamic bearing. In some embodiments, the first surface and the second surface are configured to be stationary with respect to a stationary component of the fluid dynamic bearing. In some embodiments, the first surface and the second surface bound the fluid reservoir in a symmetrical shape, an asymmetrical shape, or a spiral shape.

While the invention has been described and/or illustrated by means of various embodiments and/or examples, and while these embodiments and/or examples have been described in considerable detail, it is not the intention of the applicant(s) to restrict or in any way limit the scope of the embodiments of the invention to such detail. Additional adaptations and/or modifications of the embodiments of the invention may readily appear to persons having ordinary skill in the art to which the invention pertains, and, in its broader aspects, the embodiments of the invention may encompass these adaptations and/or modifications. Accordingly, departures may be made from the foregoing embodiments and/or examples without departing from the scope of the embodiments of the invention, which scope is limited only by the following claims when appropriately construed. The implementations described above and other implementations are within the scope of the following claims.

What is claimed:

1. An apparatus comprising:
   a stationary component;
   a rotatable component;
   a fluid dynamic bearing defined in a gap between the stationary component and the rotatable component, wherein the stationary component and the rotatable component are configured for relative rotation;
   a fluid reservoir in the stationary component or the rotatable component, wherein the fluid reservoir is bounded by surfaces that are stationary with respect to one another;
   a fluid recirculation system connected to the fluid dynamic bearing; and
   at least a channel connecting the fluid reservoir to the fluid recirculation system.

2. The apparatus of claim 1, wherein the fluid reservoir is configured to hold a volume of fluid and is configured to allow the volume of fluid to deplete.

3. The apparatus of claim 1, wherein the channel interfaces with a portion of the fluid reservoir and a gaseous environment, and wherein the channel is configured to allow a volume of fluid to deplete by replacing the volume of fluid in the fluid reservoir with the gaseous environment.

4. The apparatus of claim 1, wherein the fluid reservoir is configured to supply fluid to the fluid dynamic bearing.

5. The apparatus of claim 1, wherein the fluid reservoir is a symmetrical shape.

6. The apparatus of claim 1, further comprising:
   a further fluid reservoir in the stationary component or the rotatable component.

7. The apparatus of claim 1,
   wherein the fluid reservoir is bounded by multiple surfaces configured to rotate at approximately equal speeds with respect to each other.

8. An apparatus comprising:
   a fluid dynamic bearing defined in a gap between an inner component and an outer component, wherein the inner component and the outer component are configured for relative rotation;
   a fluid reservoir configured to supply a fluid to the fluid dynamic bearing, wherein shearless surfaces define the fluid reservoir;
   a fluid recirculation system connected to the fluid dynamic bearing; and
   at least a channel connecting the fluid reservoir to the fluid recirculation system.

9. The apparatus of claim 8, wherein the shearless surfaces are located within the inner component or the outer component.

10. The apparatus of claim 8, wherein the shearless surfaces are surfaces that are configured to be stationary.

11. The apparatus of claim 8,
    wherein the shearless surfaces are surfaces that are configured to rotate at equal speeds; and
    wherein the speed is selected from the group consisting of 5400 rotations per minute (RPM), 5800 RPM, 5900 RPM, 7200 RPM, and 10,000 RPM.

12. The apparatus of claim 8, wherein the fluid reservoir is configured to hold a volume of the fluid and is configured to allow the volume of the fluid to deplete.

13. The apparatus of claim 8, wherein the fluid reservoir supplies fluid to the fluid dynamic bearing through at least the channel.

14. An apparatus comprising:
    a first surface;
    a second surface, wherein the first surface and second surface have approximately same rotational speed relative to each other;
    a fluid reservoir bounded by the first surface and the second surface, wherein the fluid reservoir is configured to supply a fluid to a fluid dynamic bearing;
    a fluid recirculation system connected to the fluid dynamic bearing; and
    at least a channel connecting the fluid reservoir to the fluid recirculation system.

15. The apparatus of claim 14, the apparatus further comprising:
    a stationary component; and
    a rotatable component, wherein
    the stationary component or the rotatable component include the fluid reservoir, and the stationary component and the rotatable component are configured for relative rotation.

16. The apparatus of claim 15, further comprising:
a second fluid reservoir in the stationary component or the rotatable component.

17. The apparatus of claim 14, wherein the channel allows gas to enter the fluid reservoir, thereby allowing fluid to leave the fluid reservoir.

18. The apparatus of claim 14, wherein the fluid reservoir is configured to rotate with respect to a stationary component of the fluid dynamic bearing.

19. The apparatus of claim 14, wherein the first surface and the second surface are configured to be stationary with respect to a stationary component of the fluid dynamic bearing.

20. The apparatus of claim 14, wherein the first surface and the second surface bound the fluid reservoir in a symmetrical shape.

* * * * *